(12) United States Patent  (10) Patent No.: US 8,964,299 B2
Chang  (45) Date of Patent: Feb. 24, 2015

(54) HEAD-MOUNTED DISPLAY

(71) Applicant: Wistron Corporation, New Taipei (TW)

(72) Inventor: Yao-Tsung Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 89 days.

(21) Appl. No.: 13/798,142

(22) Filed: Mar. 13, 2013

(65) Prior Publication Data

US 2014/0153102 A1  Jun. 5, 2014

(30) Foreign Application Priority Data

Dec. 3, 2012 (TW) .............................. 101145275 A (51) Int. Cl.
*G02B 27/14* (2006.01)
*G02B 27/01* (2006.01)

(52) U.S. Cl.
CPC .... *G02B 27/0172* (2013.01); *G02B 2027/0127* (2013.01); *G02B 2027/0178* (2013.01)
USPC .......................................... 359/630

(58) Field of Classification Search
CPC .............................. G02B 27/017; G02B 27/01
USPC ......................................... 359/630
See application file for complete search history.

(56) References Cited

U.S. PATENT DOCUMENTS

| 5,371,556 A | 12/1994 | Suwa et al. |
| 5,379,140 A | 1/1995 | Michel et al. |
| 2012/0147038 A1* | 6/2012 | Perez et al. .................. 345/632 |

OTHER PUBLICATIONS

"Office Action of Taiwan Counterpart Application", issued on Nov. 3, 2014, with English translation thereof, p. 1- p. 6, in which the listed references were cited.

* cited by examiner

*Primary Examiner* — James Jones
(74) *Attorney, Agent, or Firm* — Jianq Chyun IP Office (57) ABSTRACT

A head-mounted display suitable for being disposed in front of at least one human eye is provided. The head-mounted display includes a transmissive type display, a focal length adjusting lens, and a compensation lens. The focal length adjusting lens is located between the human eye and the transmissive type display. The focal length adjusting lens refracts an image displayed by the transmissive type display, so that the image is formed on a retina of the human eye. The transmissive type display is located between the compensation lens and the focal length adjusting lens.

13 Claims, 5 Drawing Sheets

HEAD-MOUNTED DISPLAY

CROSS-REFERENCE TO RELATED APPLICATION

This application claims the priority benefit of Taiwan application serial no. 101145275, filed on Dec. 3, 2012. The entirety of the above-mentioned patent application is hereby incorporated by reference herein and made a part of this specification.

BACKGROUND OF THE DISCLOSURE

1. Field of the Disclosure

The disclosure relates to a display; more particularly, the disclosure relates to a head-mounted display (HMD).

2. Description of Related Art

With the continuous progress of displays or display-related technologies, the displays tend to be become light and compact to satisfy users' requirements for portability of the displays. For instance, a head-mounted display (HMD) is one of the light and compact displays. The HMD normally allows a user to observe a video signal through a pair of glasses, a pair of goggles, or a wearable helmet. Due to the inherent limitations of crystalline lens and ciliary muscle of a human eye, the area or the extent of space visible to the human eye (i.e., the minimum visible distance) is restrained. When a distance to a to-be-observed object is shorter than the minimum visible distance of the human eye, i.e., when the object is overly close to the human eye, the image of the object formed on a retina of the human eye is of insufficient clarity. Hence, the human eye is not able to see the object clearly. In view of the above, the display in a conventional HMD system is set to be apart from the human eye at a certain distance, so as to resolve the aforesaid issue that the human eye is not able to clearly observe the information displayed by the HMD. Said HMD, however, is bulky and is difficult to be worn by a user. If the volume of the HMD is reduced by shortening the distance between the HMD and the human eye, the human eye can barely see the image with clarity; what is more, the overly short distance may lead to contraction of ciliary muscle over a long period of time, and thereby the problem of eye fatigue or blurred vision may occur. Accordingly, how to effectively reduce the volume of the HMD and keep the observed image clear is one of the most imperative issues to be resolved in the industry.

SUMMARY OF THE DISCLOSURE

The disclosure is directed to a head-mounted display (HMD) equipped with a focal length adjusting lens and a compensation lens.

In an embodiment of the disclosure, an HMD suitable for being disposed in front of at least one human eye is provided, and the HMD includes a transmissive type display, a focal length adjusting lens, and a compensation lens. The focal length adjusting lens is located between the human eye and the transmissive type display and refracts an image displayed by the transmissive type display, such that the image is formed on a retina of the human eye. The transmissive type display is located between the compensation lens and the focal length adjusting lens.

According to an embodiment of the disclosure, a distance between the transmissive type display and the human eye is shorter than a minimum visible distance of the human eye.

According to an embodiment of the disclosure, the human eye observes a first virtual image corresponding to the image displayed by the transmissive type display through the focal length adjusting lens, and the transmissive type display is located between the first virtual image and the focal length adjusting lens.

According to an embodiment of the disclosure, an ambient image sequentially passes through the compensation lens, the transmissive type display, and the focal length adjusting lens and is formed on the retina of the human eye. When the ambient image passes through the compensation lens, a second virtual image is formed, and the second virtual image and the ambient image are located at the same side of the compensation lens. The human eye observes a third virtual image corresponding to the second virtual image through the focal length adjusting lens, and the second virtual image and the third virtual image are located at the same side of the focal length adjusting lens.

According to an embodiment of the disclosure, a focal distance of the compensation lens is $f_2$, a focal distance of the focal length adjusting lens is $f_1$, a distance from the focal length adjusting lens to the compensation lens is d, a distance from the ambient image to the compensation lens along an optical axis of the human eye is $p_2$, a distance from the second virtual image to the compensation lens along the optical axis of the human eye is $q_2$, and a relation between the compensation lens and the focal length adjusting lens satisfies:

$$\frac{f_2}{f_1} = \frac{-(p_2 \cdot q_2)}{(q_2+d) \cdot (p_2+d)} \cdot \alpha$$

Here, $\alpha$ is an error parameter, and $0.9 \leq \alpha \leq 1.1$.

According to an embodiment of the disclosure, a diameter of the compensation lens is greater than a size of a pupil of the human eye, and so is a diameter of the focal length adjusting lens.

According to an embodiment of the disclosure, the focal length adjusting lens is a plane-convex lens having a plane and a convex surface, and the compensation lens is a plane-concave lens having a plane and a concave surface. The plane of the focal length adjusting lens opposite to the convex surface is adhered to the transmissive type display, and the plane of the compensation lens opposite to the concave surface is adhered to the transmissive type display. The compensation lens, the transmissive type display, and the focal length adjusting lens together constitute an integral structure.

According to an embodiment of the disclosure, the head-mounted display further includes at least one socket. At least one of the compensation lens, the transmissive type display, and the focal length adjusting lens is detachably inserted into the at least one socket sequentially, such that a distance among the compensation lens, the transmissive type display, and the focal length adjusting lens is fixed.

According to an embodiment of the disclosure, the focal length adjusting lens is a convex lens, and the compensation lens is a concave lens.

According to an embodiment of the disclosure, the focal length adjusting lens is a biconvex lens, and the compensation lens is a biconcave lens.

According to an embodiment of the disclosure, the focal length adjusting lens is a plane-convex lens, and the compensation lens is a plane-concave lens.

According to an embodiment of the disclosure, the transmissive type display further includes a communication unit for sending a message to or receiving a message from an external device, and the communication unit sends or receives the message through a cable or through wireless connection.

According to an embodiment of the disclosure, the transmissive type display further includes a control unit for controlling content displayed by the transmissive type display.

As described above, in an embodiment of the disclosure, the information displayed by the transmissive type display is imaged onto the retina of the human eye through the focal length adjusting lens. Thereby, the distance between the transmissive type display and the human eye may be shortened, and the HMD may still ensure that the human eye observes clear images.

In order to make the aforementioned and other features and advantages of the disclosure more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
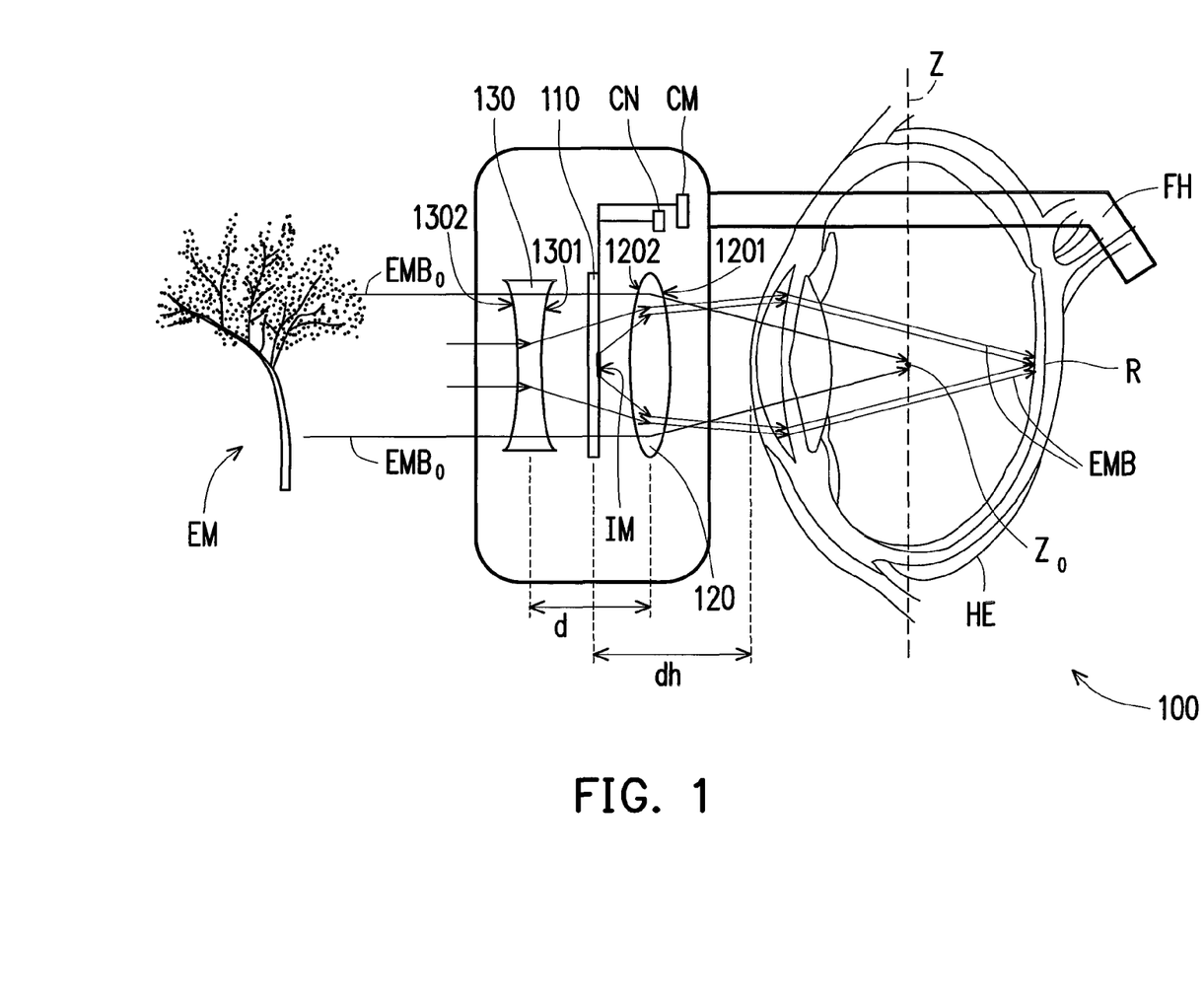
FIG. 1 is a schematic view illustrating a head-mounted display (HMD) according to an embodiment of the disclosure.

FIG. 1 is a schematic view illustrating a head-mounted display (HMD) according to an embodiment of the disclosure. With reference to FIG. 1, in the present embodiment, an HMD 100 suitable for being disposed in front of at least one human eye HE is provided, and the HMD 100 includes a transmissive type display 110, a focal length adjusting lens 120, and a compensation lens 130. The focal length adjusting lens 120 is located between the human eye HE and the transmissive type display 110 and refracts an image IM displayed by the transmissive type display 110, such that the image IM is formed on a retina R of the human eye HE. The focal length adjusting lens 120 is a convex lens; in the present embodiment, the focal length adjusting lens 120 is a biconvex lens, for instance, which should however not be construed as a limitation to the disclosure. In another embodiment, the focal length adjusting lens 120 may be a plane-convex lens. The compensation lens 130 is a concave lens; in the present embodiment, the compensation lens 130 is a biconcave lens, for instance, which should however not be construed as a limitation to the disclosure. In another embodiment, the compensation lens 130 may be a plane-concave lens.

As shown in FIG. 1, the transmissive type display 110 is located between the compensation lens 130 and the focal length adjusting lens 120. The human eye HE may observe the image IM displayed by the transmissive type display 110 through the focal length adjusting lens 120 and may also observe external surroundings (e.g., an ambient image EM shown in FIG. 1) sequentially through the focal length adjusting lens 120, the transmissive type display 110, and the compensation lens 130. That is, when a user wears the HMD 100, the human eye HE of the user may simultaneously observe the ambient image EM and the image IM displayed by the transmissive type display 110, and the information provided by the HMD 100 facilitates the life of the user without disturbing his or her routine. Here, the information includes but is not limited to traffic information, weather forecast, schedule reminders, incoming-call messages, map navigation, time reminders, and so on.

According to the present embodiment, the HMD 100 may further include a frame unit FH on which the transmissive type display 110, the focal length adjusting lens 120, and the compensation lens 130 are located. In the embodiment shown in FIG. 1, the frame unit FH is an eyeglass frame, for instance, while the frame unit FH may be any component suitable for being worn by a user around his or her eyes. The disclosure is not limited thereto. The transmissive type display 110 may further include a communication unit CM and a control unit CN. The communication unit CM and the control unit CN may be placed in the HMD 100 without hindering the human eye HE from observing the ambient image EM and the information displayed by the transmissive type display 110. For instance, as shown in FIG. 1, the communication unit CM and the control unit CN may be placed around the joint portion between the eyeglass frame and the lens.

As shown in FIG. 1, the control unit CN may include a central processing unit (CPU) or a microcontroller for controlling the content displayed by the transmissive type display 110 or processing relevant information. The communication unit CM may serve to send a message to or receive a message from an external device (e.g., a network server, a wireless signal transceiver, etc.), and the communication unit CM sends or receives the message through a cable or through wireless connection. The transmissive type display 110 may obtain the information through the communication unit CM. For instance, the HMD 100 worn by a car driver may receive information of map navigation and provide the received information to the car driver anytime. Alternatively, when a user wearing the HMD 100 intends to take public transportation (e.g., the subway), the HMD 100 may receive the updated departure timetable, thus further facilitating the use of the HMD 100.

In particular, according to the present embodiment, a distance dh between the transmissive type display 110 and the human eye HE is shorter than a minimum visible distance of the human eye HE. Namely, the transmissive type display 110 may be placed close to the human eye HE. Hence, even though the image IM that is displayed by the transmissive type display 110 and formed on the retina R of the human eye HE appears blurred, through the adjustment of the focal length adjusting lens 120, the clarity of the image IM formed on the retina R of the human eye HE can be ensured. The focal length adjusting lens 120 described herein is a biconvex lens, whereas the focal length adjusting lens 120 described in other embodiments of the disclosure may be a plane-convex lens or any other type of lens with the focusing capability, which should not be construed as a limitation to the disclosure.

Thereby, the limitation to the human eye which cannot observe an object within the minimum visible distance may be alleviated. Moreover, when the human eye HE observes an overly close object, the excessive contraction of ciliary muscle and the thickened crystalline lens of the human eye HE may result in the problem of eye fatigue or pseudomyopia. Through the adjustment of the focal length adjusting lens 120, said problem may no longer occur. Here, the minimum visible distance refers to the shortest distance within which the human eye HE may observe the clear image of the object under normal circumstances. The minimum visible distance is often determined by the accommodation ability of the crystalline lens of the human eye HE, and the accommodation ability may different from person to person. In the present embodiment, the minimum visible distance of the human eye HE is shorter than 7.5 cm, for instance, which should however not be construed as a limitation to the disclosure. In addition, according to the present embodiment, even though the transmissive type display 110 is located close to the human eye HE (e.g., within the minimum visible distance of the human eye HE in case that no glasses are worn), the image IM can be formed on the retina R of the human eye HE because of the adjustment of the focal length adjusting lens 120. As such, the volume of the HMD 100 is further reduced, the image quality remains favorable, and the comfort of the user is guaranteed.

The configuration of the focal length adjusting lens 120, however, may pose an impact on the ambient image EM. Specifically, the ambient image EM formed on the retina R of the human eye HE is originally clear; nevertheless, the focal length adjusting lens 120 may advance the convergence of the ambient image EM. Thereby, the ambient image EM is formed in front of the retina R, and thus the human eye HE observes the blurred ambient image EM. For instance, as shown in FIG. 1, the image beam $EMB_0$ converges on a focal plane Z at a location $Z_0$ in front of the retina R without configuring the compensation lens 130, such that the image beam $EMB_0$ cannot be clearly imaged onto the retina R.

Said deficiency may be corrected by the compensation lens 130. The ambient image EM from the external surroundings passes through the compensation lens 130 and is then transmitted to the transmissive type display 110 and the focal length adjusting lens 120, such that the human eye HE may observe the clear ambient image EM. For instance, the image beam EMB may be clearly imaged onto the retina R after the image beam EMB propagating through the compensation lens 130 and the focal length adjusting lens 120. Thereby, the human eye HE is able to observe the clear image IM displayed by the transmissive type display 110 and simultaneously view the ambient image with sufficient clarity from the surroundings. As such, the interaction between the user and the surroundings may be enhanced, the user's perception of augmented reality (AR) may be enhanced, and the image quality may be improved. The compensation lens 130 described herein is a biconcave lens, whereas the compensation lens 130 described in other embodiments of the disclosure may be a plane-concave lens or any other type of lens with the dispersion capability, which should not be construed as a limitation to the disclosure.

Figure 2A:
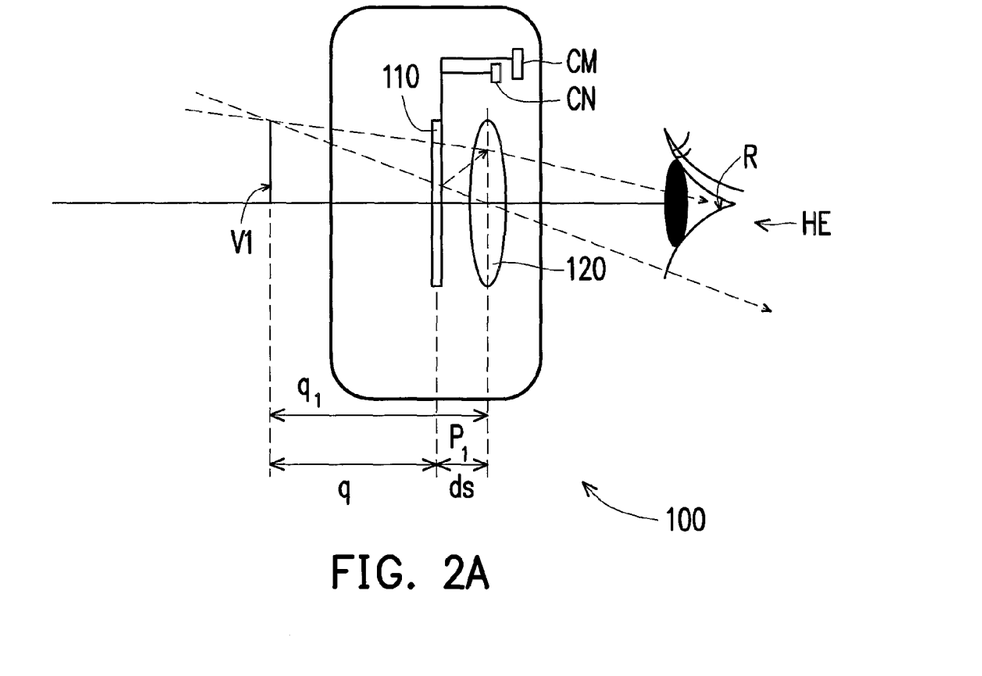
FIG. 2A is a schematic view illustrating formation of a first virtual image according to the embodiment depicted in FIG. 1.

FIG. 2A is a schematic view illustrating formation of a first virtual image according to the embodiment depicted in FIG. 1. With reference to FIG. 1 and FIG. 2A, particularly, the human eye HE observes a first virtual image V1 corresponding to the image IM (shown in FIG. 1) displayed by the transmissive type display 110 through the focal length adjusting lens 120, and the transmissive type display 110 is located between the first virtual image V1 and the focal length adjusting lens 120.

For instance, in the present embodiment, a focal distance of the focal length adjusting lens 120 is $f_1$, and a distance from the transmissive type display 110 to the focal length adjusting lens 120 is ds. At this time, the human eye HE may observe the upright, enlarged first virtual image V1 corresponding to the image IM (shown in FIG. 1) displayed by transmissive type display 110 through the focal length adjusting lens 120. To be specific, a distance between the first virtual image V1 and the center of the focal length adjusting lens 120 is an image distance $q_1$=(ds+q), and an object distance $P_1$ is equal to the distance ds. Since the object distance $P_1$ is shorter than the focal distance $f_1$, the resultant image is the first virtual image V1. If the image distance $q_1$ is assumed to have a negative value, the object distance $P_1$ and the image distance $q_1$ satisfy the following:

$$\frac{1}{P_1} + \frac{1}{-q_1} = \frac{1}{ds} + \frac{1}{-(ds+q)} = \frac{1}{f_1}$$

According to the present embodiment, in order for the human eye HE to observe the first virtual image V1 corresponding to the image IM (shown in FIG. 1) displayed by the transmissive type display 110 through the focal length adjusting lens 120, the transmissive type display 110 may be located within the focal distance $f_1$ of the focal length adjusting lens 120. Besides, the distance dh from the transmissive type display 110 and the human eye HE may be shorter than the minimum visible distance of the human eye HE. At this time, the human eye HE is still able to observe the upright, enlarged first virtual image V1 corresponding to the image IM (shown in FIG. 1) displayed by the transmissive type display 110 through the focal length adjusting lens 120, and the first virtual image V1 and the human eye HE are located on two different sides of the transmissive type display 110.

Figure 2B:
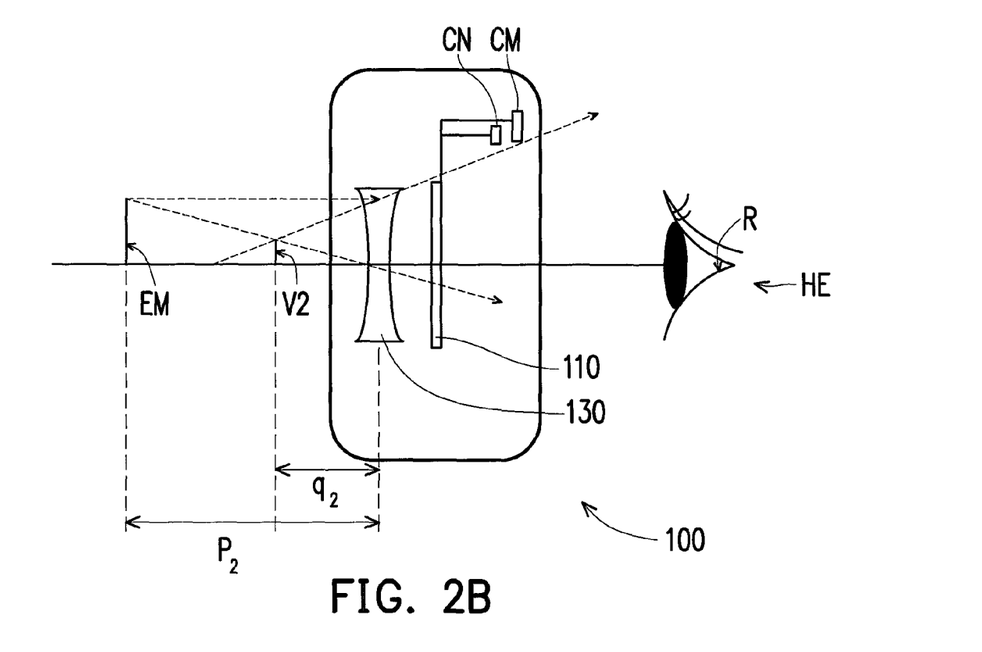
FIG. 2B is a schematic view illustrating formation of a second virtual image according to the embodiment depicted in FIG. 1.
Figure 2C:
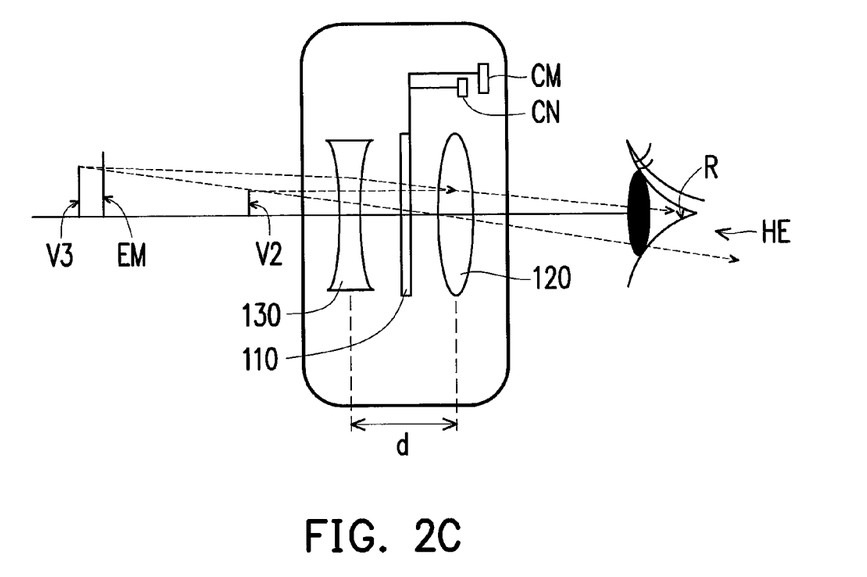
FIG. 2C is a schematic view illustrating formation of a third virtual image according to the embodiment depicted in FIG. 1.

FIG. 2B is a schematic view illustrating formation of a second virtual image according to the embodiment depicted in FIG. 1. FIG. 2C is a schematic view illustrating formation of a third virtual image according to the embodiment depicted in FIG. 1. With reference to FIG. 2B, the ambient image EM described in the present embodiment sequentially passes through the compensation lens 130, the transmissive type display 110, and the focal length adjusting lens 120 and is formed on the retina R. When the ambient image EM passes through the compensation lens 130, a second virtual image V2 is formed, and the second virtual image V2 and the ambient image EM are located at the same side of the compensation lens 130.

That is, as shown in FIG. 2B, the second virtual image V2 and the ambient image EM are both located on the side of the compensation lens 130 away from the human eye HE, such that the human eye HE observes the upright, shrunk ambient image EM (i.e., the second virtual image V2). Here, the focal distance of the compensation lens 130 is $f_2$, a distance from the ambient image EM to the center of the compensation lens 130 is an object distance $P_2$, and a distance from the second virtual image V2 and the center of the compensation lens 130 is an image distance $q_2$. Since the object distance $P_2$ is shorter than the focal distance $f_2$, the resultant image is the second virtual image V2. If the image distance $q_2$ is assumed to have a negative value, the object distance $P_2$ and the image distance $q_2$ satisfy the following:

$$\frac{1}{P_2} + \left(-\frac{1}{q_2}\right) = \frac{1}{f_2}$$

With reference to FIG. 2C, when both the focal length adjusting lens 120 and the compensation lens 130 are taken into consideration, the human eye HE may observe a third virtual image V3 corresponding to the second virtual image V2 through the focal length adjusting lens 120, and the third virtual image V3 and the second virtual image V2 are located at the same side of the focal length adjusting lens 120. That is, as shown in FIG. 2C, the third virtual image V3 and the second virtual image V2 are both located on one side of the compensation lens 130 away from the human eye HE. In order for the human eye HE to observe the first virtual image V1 corresponding to the image IM (shown in FIG. 1) displayed by the transmissive type display 110 and simultaneously have the perception of relative distances of nearby objects, the ambient image EM observed by the user (who wears the HMD 100) through the focal length adjusting lens 120, the transmissive type display 110, and the compensation lens 130 has the size similar to the size of the ambient image EM observed when the user does not wear the HMD 100, and the distance from the ambient image EM to the user wearing the HMD 100 is similar to the distance from the ambient image EM to the user who does not wear the HMD 100. Namely, to the human eye HE, the location where the third virtual image V3 is formed is close to the spatial location of the ambient image EM.

In the present embodiment, the distance from the third virtual image V3 to the human eye HE and the distance from the ambient image EM to the human eye HE may be within the similar range; thereby, the human eye HE may observe the information displayed by the transmissive type display 110 through the focal length adjusting lens 120, and at this time the human eye HE may still have the similar perception of the distance of nearby objects. As such, the volume of the HMD 100 may be reduced, and the image display quality remains favorable without compromising the user's perception of the distance of nearby objects. For instance, in the present embodiment, the image size error range is substantially 10%. When the distance between the ambient image EM and the human eye HE ranges from 90 cm to 110 cm, the distance between the third virtual image V3 and the human eye HE ranges from 90 cm to 110 cm as well. Namely, within said range, the error range of the size of the ambient image EM sensed by the human eye HE is within 10%, and the human eye HE at this time may observe the information displayed by the transmissive type display 110.

Particularly, in view of the above, the focal distance relation between the focal length adjusting lens 120 and the compensation lens 130 may be demonstrated as follows:

$$\frac{f_2}{f_1} = \frac{-(p_2 \cdot q_2)}{(q_2 + d) \cdot (p_2 + d)} \cdot \alpha$$

Here, $\alpha$ is an error parameter, and $0.9 \leq \alpha \leq 1.1$. If the ambient image EM is not far from the human eye HE (e.g., the distance from the ambient image EM to the human eye HE is shorter than 250 mm in the present embodiment), the absolute value of the ratio of the focal distance $f_2$ of the compensation lens 130 to the focal distance $f_1$ of the focal length adjusting lens 120 is smaller than 1, i.e., the focal distance $f_2$ of the compensation lens 130 is slightly shorter than the focal distance $f_1$ of the focal length adjusting lens 120. Thereby, the human eye HE may observe the clear image displayed by the transmissive type display 110 and the clearly ambient image EM when the user wears the HMD 100 indoors or in an environment where the surrounding objects are nearby, for instance.

However, if the ambient image EM is far from the human eye HE (e.g., the distance from the ambient image EM to the human eye HE is greater than or substantially equal to 250 mm in the present embodiment), the distance d between the compensation lens 130 and the focal length adjusting lens 120 is much smaller than the image distance $q_2$ and the object distance $P_2$ of the second virtual image V2 and the distance d may be ignored. At this time, the absolute value of the ratio of the focal distance $f_2$ of the compensation lens 130 to the focal distance $f_1$ of the focal length adjusting lens 120 is close to 1. Practically, the focal distance $f_2$ of the compensation lens 130 may be designed to be equal to the focal distance $f_1$ of the focal length adjusting lens 120. Thereby, the human eye HE may observe the clear image displayed by the transmissive type display 110 and the clearly ambient image EM when the user wears the HMD 100 outdoors or in a wide-open environment, for instance.

In particular, according to the present embodiment, the numeric values of the focal distance $f_1$ of the focal length adjusting lens 120, radii $r_1$ and $r_2$ of curvatures of the focal length adjusting lens 120, the focal distance $f_2$ of the compensation lens 130, and radii $R_1$ and $R_2$ of curvatures of the compensation lens 130 may be exemplified in the following Table 1:

TABLE 1

| | Focal distance when $P_2 \geq 250$ mm | Radius of curvature of lens when $P_2 \geq 250$ mm | Focal distance when $P_2 < 250$ mm | Radius of curvature of lens when $P_2 < 250$ mm |
|---|---|---|---|---|
| Focal length adjusting lens | $f_1 = 5.555$ mm | $r_1 = -6.4994$ mm<br>$r_2 = 6.4994$ mm | $f_1 = 5.555$ mm | $r_1 = -6.4994$ mm<br>$r_2 = 6.4994$ mm |
| Compensation lens | $f_2 = -5.555$ mm | $R_1 = 6.4994$ mm<br>$R_2 = -6.4994$ mm | $f_2 = -5.1359$ mm | $R_1 = 6.009$ mm<br>$R_2 = -6.009$ mm |

In Table 1, the information obtained when the object distance $q_2$ is shorter than 250 mm is calculated on the conditions that the distance d between the focal length adjusting lens 120 and the compensation lens 130 is 10 mm and the object distance $P_2$ and the image distance $q_2$ are both equal to 250 mm. Note that the information contained in Table 1 is merely exemplified to explain the present embodiment, and the information may differ in other embodiments according to actual design demands. The disclosure is not limited thereto. The positive or negative values of the radii $r_1$ and $r_2$ of curvatures and the radii $R_1$ and $R_2$ of curvatures in Table 1 represent the direction in which the surfaces of the lenses are bent. That is, according to the present embodiment, if the radius of curvature has the positive value, the center of the curvature is located at the right side of the surface of the lens; if the radius of the curvature has the negative value, the center of the curvature is located at the left side of the surface of the lens.

For instance, as shown in FIG. 1, the center of the curvature of the surface 1201 of the focal length adjusting lens 120 is located at the left side of the surface 1201, and thus the radius r1 of curvature of the surface 1201 has the negative value; the center of the curvature of the surface 1202 of the focal length adjusting lens 120 is located at the right side of the surface 1202, and thus the radius r2 of curvature of the surface 1202 has the positive value. On the other hand, the center of the curvature of the surface 1301 of the compensation lens 130 is located at the left side of the surface 1301, and thus the radius R1 of curvature of the surface 1301 has the negative value; the center of the curvature of the surface 1302 of the compensation lens 130 is located at the right side of the surface 1302, and thus the radius R2 of curvature of the surface 1302 has the positive value.

Figure 2D:
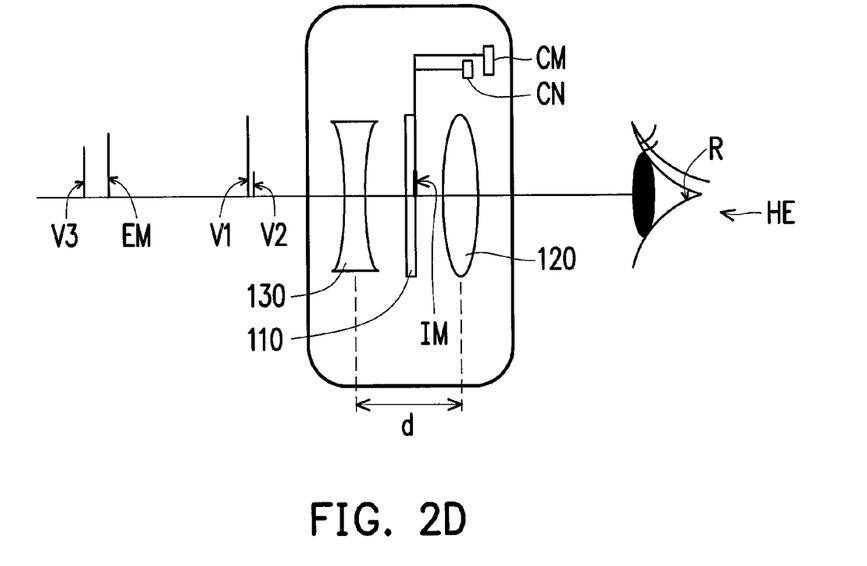
FIG. 2D is a schematic view illustrating formation of the first, second, and third virtual images.

FIG. 2D is a schematic view illustrating formation of the first, second, and third virtual images. With reference to FIG. 2D, in the present embodiment, FIG. 2A shows the imaging location of the first virtual image V1 (i.e. the virtual image corresponding to the image IM displayed by the transmissive type display 110) observed by the human eye HE, and FIG. 2C shows the imaging location of the third virtual image V3 (i.e. the virtual image corresponding to the second virtual image V2 of the ambient image EM) observed by the human eye HE. In FIG. 2D, the human eye HE through the HMD 100 observes the first virtual image V1 (from the transmissive type display 110) and the third virtual image V3 (from the ambient image EM). To the human eye HE, the imaging location of the third virtual image V3 is close to the spatial location of the ambient image EM, and hence the distance from the third virtual image V3 to the human eye HE is close to the distance from the real ambient image EM to the human eye HE. Thereby, the human eye HE does not suffer from the size and distance illusions, and the easy use of the HMD 100 can still be ensured. In addition, the human eye HE may also observe the image displayed by the transmissive type display 110, which brings the user comfort, convenience, and pleasure.

Figure 3A:
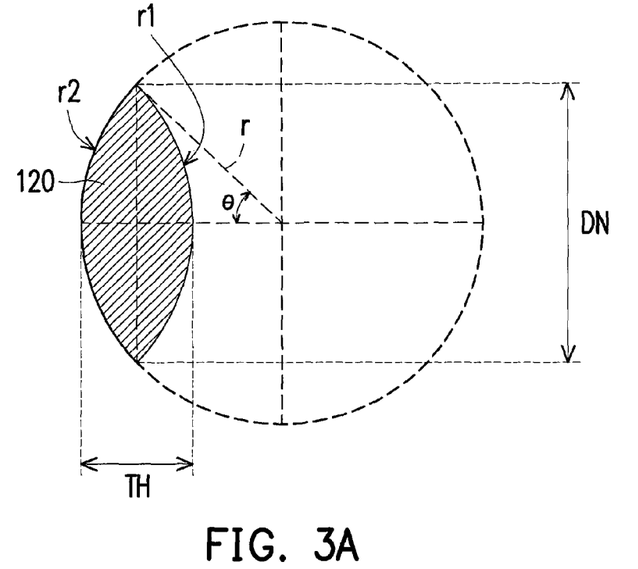
FIG. 3A is a schematic view illustrating a design of the focal length adjusting lens according to the embodiment depicted in FIG. 1.
Figure 3B:
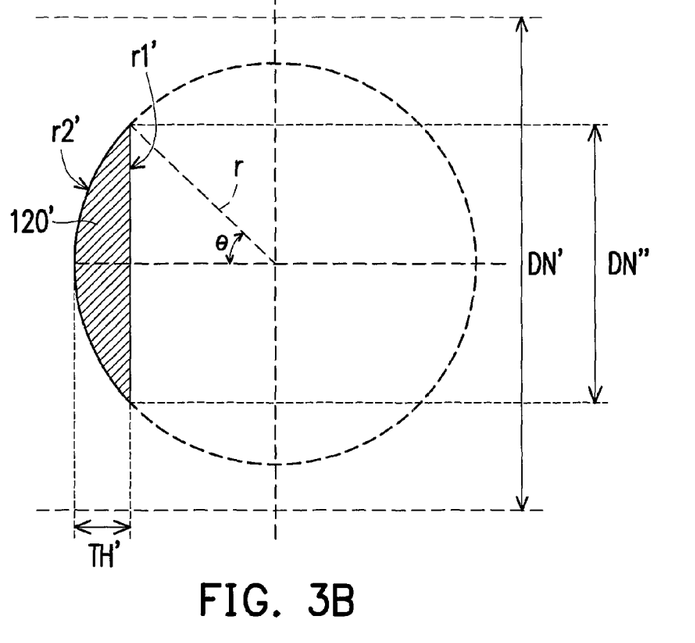
FIG. 3B is a schematic view illustrating another design of the focal length adjusting lens according to the embodiment depicted in FIG. 1.

FIG. 3A is a schematic view illustrating a design of the focal length adjusting lens according to the embodiment depicted in FIG. 1. FIG. 3B is a schematic view illustrating another design of the focal length adjusting lens according to the embodiment depicted in FIG. 1. With reference to FIG. 1, FIG. 3A, and FIG. 3B, in the present embodiment, a diameter of the compensation lens 130 is greater than a size of a pupil of the human eye HE, and so is a diameter of the focal length adjusting lens 120. Particularly, the HMD 100 is located close to the human eye HE (e.g., the distance from the HMD 100 to the human eye HE is 15-20 mm); therefore, in order for the human eye HE to comfortably observe the image displayed by the transmissive type display 110, the image IM displayed by the transmissive type display 110 may be virtually moved to a place relatively far from the human eye HE (e.g., approximately 80 mm away from the human eye HE in the present embodiment) through the focal length adjusting lens 120. Additionally, in the present embodiment, the distance ds between the focal length adjusting lens 120 and the transmissive type display 110 is about 5 mm and may be represented as follows:

$$\frac{1}{f} = \frac{1}{P} + \frac{1}{q} = \left(\frac{n_2}{n_1} - 1\right) \cdot \left(\frac{1}{r_1} + \frac{1}{r_2}\right) = (n_{12} - 1) \cdot \left(\frac{1}{r_1} + \frac{1}{r_2}\right)$$

Here, $n_{12}$ refers to the refraction index of the material of the lens to the air. IN the present embodiment, the material of the lens is polycarbonate (PC), for instance, and the refraction index of PC is approximately 1.584-1.586. On the conditions that the distance ds (i.e., the object distance P) between the focal length adjusting lens 120 and the transmissive type display 110 is about 5 mm, and that the distance between the human eye HE and the transmissive type display 110 perceived by the human eye HE is approximately 80 mm, the calculated focal distance $f_1$ of the focal length adjusting lens 120 is approximately 5.333 mm. In the present embodiment, the focal length adjusting lens 120 is, for instance, a biconvex lens, the radii $r_1$ and $r_2$ of curvatures (collectively referred to as the radius r of curvature) of the two convex surfaces of the focal length adjusting lens 120 are the same, and the radius r of curvature may be calculated as 6.4994 mm based on the above equation (as shown in FIG. 3A). In addition to the focal distance and the radius r of curvature of the focal length adjusting lens 120, the size of the pupil of the human eye HE needs to be taken into account.

Generally, the diameter of the pupil of the human eye HE may range from about 1.5 mm to about 8 mm, and the size of the pupil of the human eye HE ranges from about 2 mm to about 3 mm when the human eye HE looks at an object. In order to meet a variety of requirements, the diameter of the focal length adjusting lens 120 in the present embodiment is at least greater than or substantially equal to the diameter of the pupil of the human eye HE (e.g., 8 mm). As shown in FIG. 3A, the radius r of curvature of the focal length adjusting lens 120 is approximately 6.4994 mm, and the diameter DN of the focal length adjusting lens 120 is approximately 10 mm. Thereby, the calculated r sin θ is equal to 5 mm. The thickness TH of the focal length adjusting lens 120 may be calculated by the following equation:

$$\theta = \arc(\sin(5/r)), TH = 2 \cdot r(1 - \cos\theta)$$

When the aforesaid numeric values are substituted for the variables in the equation, the calculated thickness TH is approximately 4.694 mm. That is, the thickness TH of the focal length adjusting lens 120 allows the distance between the center of the focal length adjusting lens 120 and the transmissive type display 110 to be 5 mm constantly; what is more, the effects of the focal length adjusting lens 120 accomplished in the embodiments shown in FIG. 1 to FIG. 2D may also be achieved herein.

However, with reference to FIG. 3B, when the focal length adjusting lens is the plane-convex lens 120' shown in FIG. 3B, the numeric value of $r_2$ may be calculated as approximately 3.2496 mm based on the above-referenced equation because the radius $r_1'$ of curvature is infinite. Hence, given that the diameter DN' of the focal length adjusting lens 120' is 10 mm constantly, r sin θ=5 (mm); nevertheless, in FIG. 3B, r=3.2496 mm, and sin θ≤1 (i.e., the plane-convex lens is required to be smaller than a biconvex lens due to the limitation of the radius r of curvature), and thus the diameter of the focal length adjusting lens 120' may be overly small and cannot correspond to the size of the pupil of the human eye HE. If the diameter DN'' of the pupil is set to be about 6 mm, the thickness TH' may be calculated by the following equations:

$$\theta = \arc(\sin(3/r)), TH' = 2 \cdot r(1 - \cos\theta)$$

After calculation, the thickness TH' is approximately 1.2489 mm. That is, in case that the size of the pupil of the human eye HE is 6 mm, the thickness TH' of the focal length adjusting lens 120' allows the distance between the center of the focal length adjusting lens 120' and the transmissive type display 110 to be 5 mm constantly; thereby, the effects achieved by the focal length adjusting lens 120' shaped as a biconvex lens may also be achieved herein when the visible range of the human eye HE is slightly reduced.

Figure 4A:
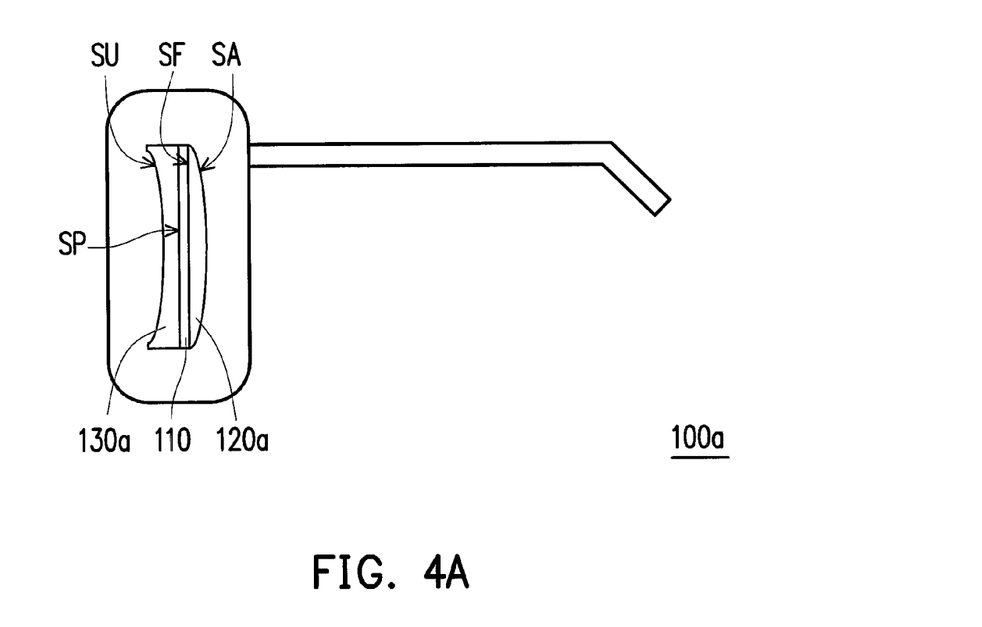
FIG. 4A is a schematic view illustrating an HMD according to another embodiment of the disclosure.
Figure 4B:
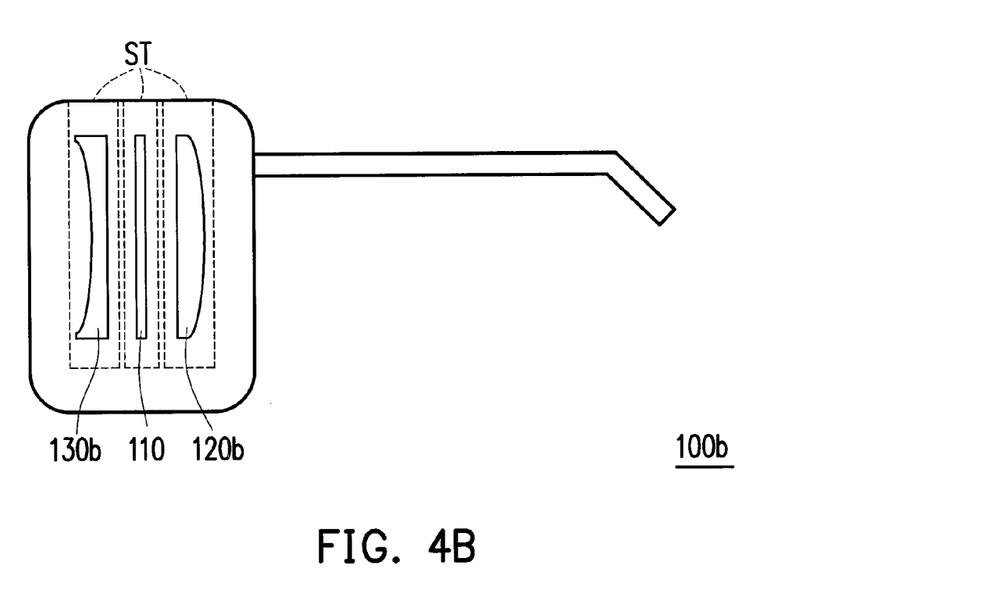
FIG. 4B is a schematic view illustrating an HMD according to still another embodiment of the disclosure.

FIG. 4A is a schematic view illustrating an HMD according to another embodiment of the disclosure. FIG. 4B is a schematic view illustrating an HMD according to still another embodiment of the disclosure. With reference to FIG. 4A, in the present embodiment, the focal length adjusting lens 120a is a plane-convex lens having a plane SF and a convex surface SA, and the compensation lens 130a is a plane-concave lens having a plane SP and a concave surface SU. The plane SF of the focal length adjusting lens 120a opposite to the convex surface SA is adhered to the transmissive type display 110, and the plane SP of the compensation lens 130a opposite to the concave surface SU is also adhered to the transmissive type display 110. The compensation lens 130a, the transmissive type display 110, and the focal length adjusting lens 120a together constitute an integral structure. Thereby, the thickness and the weight of the HMD 100a may be further reduced, which brings convenience and everlasting comfort to the user.

Here, the way to adhere the compensation lens 130a, the transmissive type display 110, and the focal length adjusting lens 120a may refer to a direct-bonding method or an air-bonding method. In other words, the transmissive type display 110 may be formed on the plane SP of the compensation lens 130a by performing a manufacturing process of an organic light-emitting diode (OLED) or a thin film transistor liquid crystal display (TFT-LCD), and the resultant transmissive type display 110 is then adhered to the focal length adjusting lens 120a. In another embodiment of the disclosure, the focal length adjusting lens 120 shaped as a biconvex lens and the compensation lens 130 shaped as a biconcave lens may also be adhered together to constitute an integral structure in the same manner as that described above, which should not be construed as a limitation to the disclosure.

With reference to FIG. 4B, the HMD 100b may further include a plurality of sockets ST. The compensation lens 130b, the transmissive type display 110, and the focal length adjusting lens 120b are detachably inserted into the sockets ST sequentially, such that a distance among the compensation lens 130b, the transmissive type display 110, and the focal length adjusting lens 120b is fixed. Additionally, based on actual demands, the lenses described herein may be replaced by other lenses with different functions, e.g., a compensation lens 130b with a ultraviolet filter film, a focal length adjusting lens 120b designed for different vision conditions of users (myopia or hyperopia), and so on. In other embodiments, however, one or two of the compensation lens 130b, the transmissive type display 110, and the focal length adjusting lens 120b may be fixed into the HMD 100b, which should not be construed as a limitation to the disclosure. Besides, in FIG. 4B, the direction in which the sockets ST are arranged and the number of the sockets ST are merely exemplified to explain the present embodiment and should not be construed as limitations to the disclosure.

To sum up, in an embodiment of the disclosure, the focal length adjusting lens is located between the human eye and the transmissive type display; when the transmissive type display is located within the minimum visible distance of the human eye, the human eye is still able to observe the information displayed by the transmissive type display. Moreover, in an embodiment of the disclosure, the compensation lens is applied to compensate changes made by the focal length adjusting lens to the ambient image. Thereby, when the human eye is able to observe the clear image displayed by the transmissive type display, the human eye may simultaneously observe the ambient image which substantially illustrates the actual nearby objects. Namely, the use of the compensation lens contributes to the user's perception of distance.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A head-mounted display suitable for being disposed in front of at least one human eye, the head-mounted display comprising:
a transmissive display;
a focal length adjusting lens located between the transmissive display and the at least one human eye, the focal length adjusting lens refracting an image displayed by the transmissive display, such that the image is formed on a retina of the at least one human eye; and
a compensation lens, wherein the transmissive display is located between the compensation lens and the focal length adjusting lens,
wherein an ambient image sequentially passes through the compensation lens, the transmissive display, and the focal length adjusting lens and is formed on the retina of the at least one human eye, when the ambient image passes through the compensation lens, a second virtual image is formed, and the second virtual image and the ambient image are located at a same side of the compensation lens, the at least one human eye observes a third virtual image corresponding to the second virtual image through the focal length adjusting lens, and the second virtual image and the third virtual image are located at a same side of the focal length adjusting lens.

2. The head-mounted display as recited in claim 1, wherein a distance between the transmissive display and the at least one human eye is shorter than a minimum visible distance of the at least one human eye.

3. The head-mounted display as recited in claim 2, wherein the at least one human eye observes a first virtual image corresponding to the image displayed by the transmissive display through the focal length adjusting lens, and the transmissive display is located between the first virtual image and the focal length adjusting lens.

4. The head-mounted display as recited in claim 1, wherein a focal distance of the compensation lens is $f_2$, a focal distance of the focal length adjusting lens is $f_1$, a distance from the focal length adjusting lens to the compensation lens is d, a distance from the ambient image to the compensation lens along an optical axis of the at least one human eye is $p_2$, a distance from the second virtual image to the compensation lens along the optical axis of the at least one human eye is $q_2$, and a relation between the compensation lens and the focal length adjusting lens satisfies:

$$\frac{f_2}{f_1} = \frac{-(p_2 \cdot q_2)}{(q_2+d) \cdot (p_2+d)} \cdot \alpha$$

wherein $\alpha$ is an error parameter, and $0.9 \leq \alpha \leq 1.1$.

5. The head-mounted display as recited in claim 1, wherein a diameter of the compensation lens is greater than a size of a pupil of the at least one human eye, and a diameter of the focal length adjusting lens is greater than the size of the pupil of the at least one human eye.

6. The head-mounted display as recited in claim 1, wherein the focal length adjusting lens is a plane-convex lens having a plane and a convex surface, the compensation lens is a plane-concave lens having a plane and a concave surface, the plane of the focal length adjusting lens opposite to the convex surface is adhered to the transmissive display, the plane of the compensation lens opposite to the concave surface is adhered to the transmissive display, and the compensation lens, the transmissive display, and the focal length adjusting lens together constitute an integral structure.

7. The head-mounted display as recited in claim 1, further comprising at least one socket, at least one of the compensation lens, the transmissive display, and the focal length adjusting lens is detachably inserted into the at least one socket sequentially, such that a distance among the compensation lens, the transmissive display, and the focal length adjusting lens is fixed.

8. The head-mounted display as recited in claim 1, wherein the focal length adjusting lens is a convex lens, and the compensation lens is a concave lens.

9. The head-mounted display as recited in claim 8, wherein the focal length adjusting lens is a biconvex lens, and the compensation lens is a biconcave lens.

10. The head-mounted display as recited in claim 8, wherein the focal length adjusting lens is a plane-convex lens, and the compensation lens is a plane-concave lens.

11. The head-mounted display as recited in claim 2, wherein the transmissive display further comprises a communication unit for sending a message to or receiving a message from an external device, and the communication unit sends or receives the message through a cable or through wireless connection.

12. The head-mounted display as recited in claim 2, wherein the transmissive display further comprises a control unit for controlling content displayed by the transmissive display.

13. A head-mounted display suitable for being disposed in front of at least one human eye, the head-mounted display comprising:
 a transmissive display;
 a focal length adjusting lens located between the transmissive display and the at least one human eye, the focal length adjusting lens refracting an image displayed by the transmissive display, such that the image is formed on a retina of the at least one human eye; and
 a compensation lens, wherein the transmissive display is located between the compensation lens and the focal length adjusting lens,
 wherein a distance between the transmissive display and the at least one human eye is shorter than a minimum visible distance of the at least one human eye, and the minimum visible distance is a shortest distance within which the human eye capable of observing the clear image of the object.

* * * * *